INVENTOR
EDWIN L. CLINE

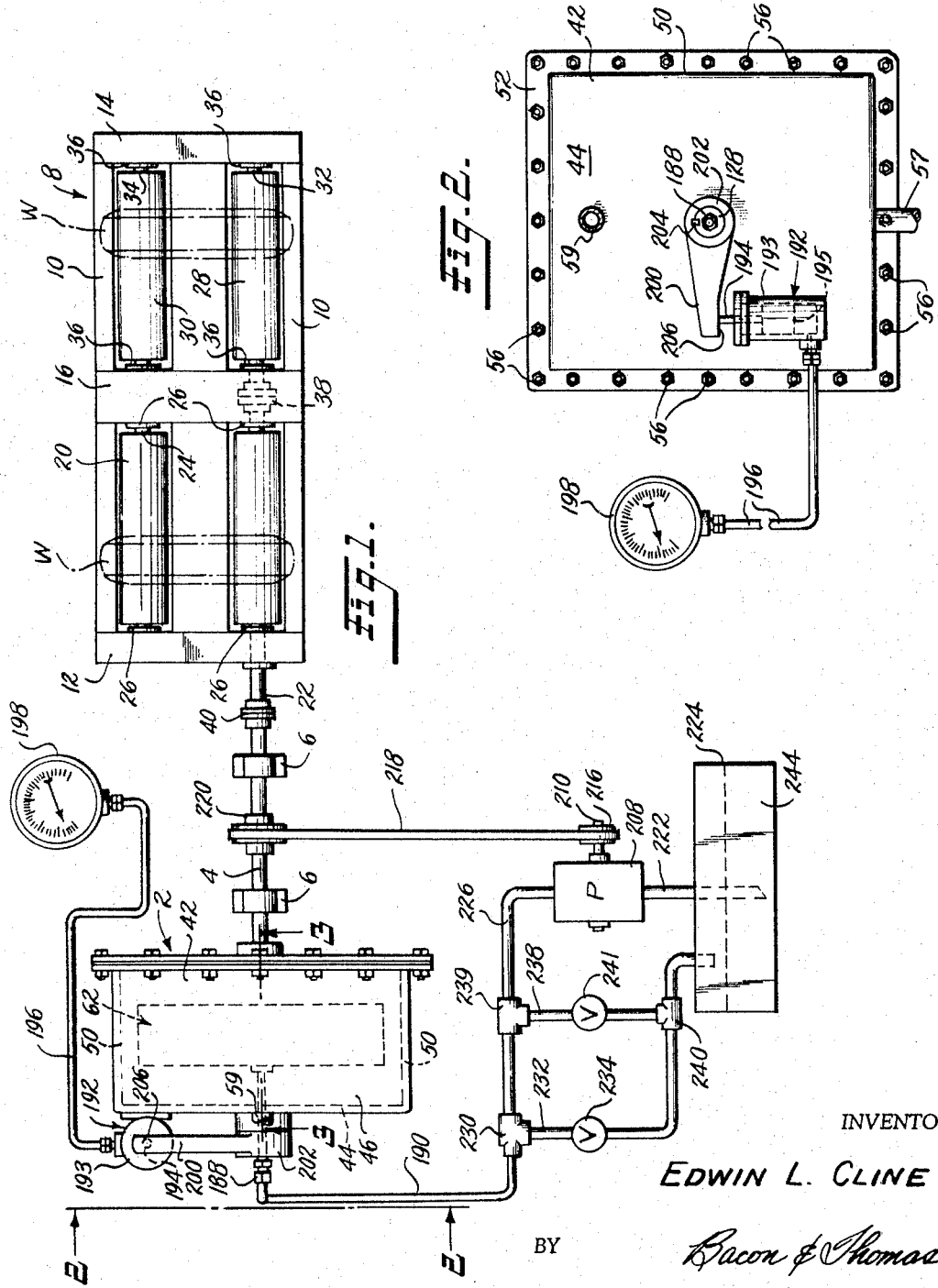

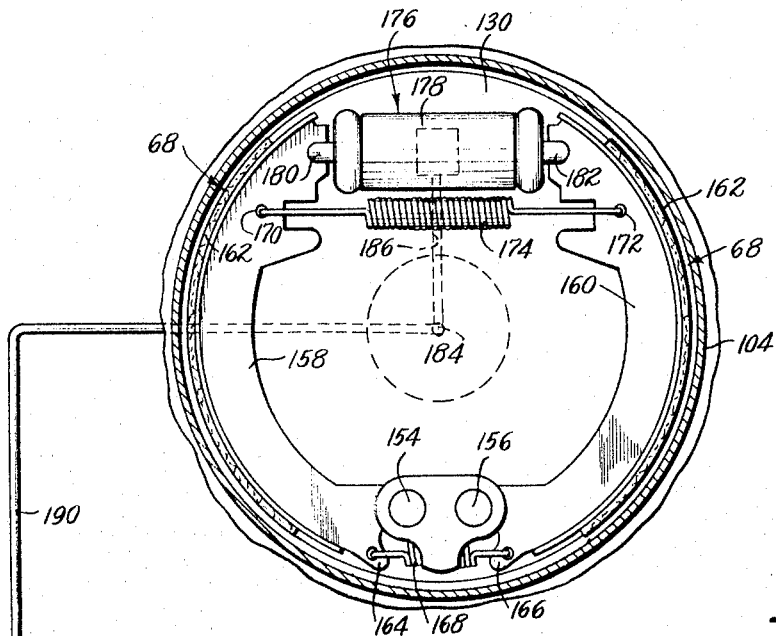
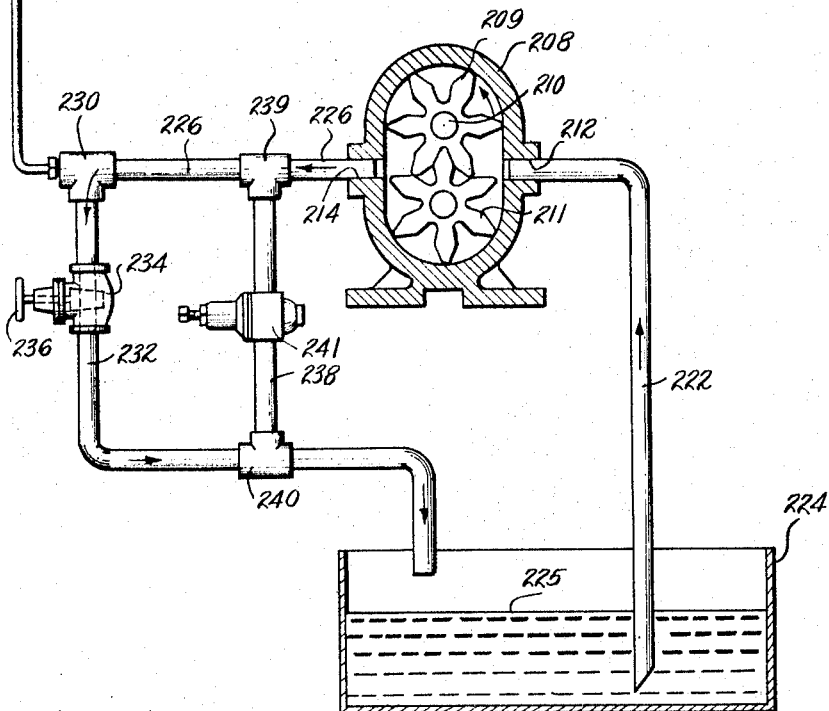
Fig. 4.
INVENTOR
EDWIN L. CLINE

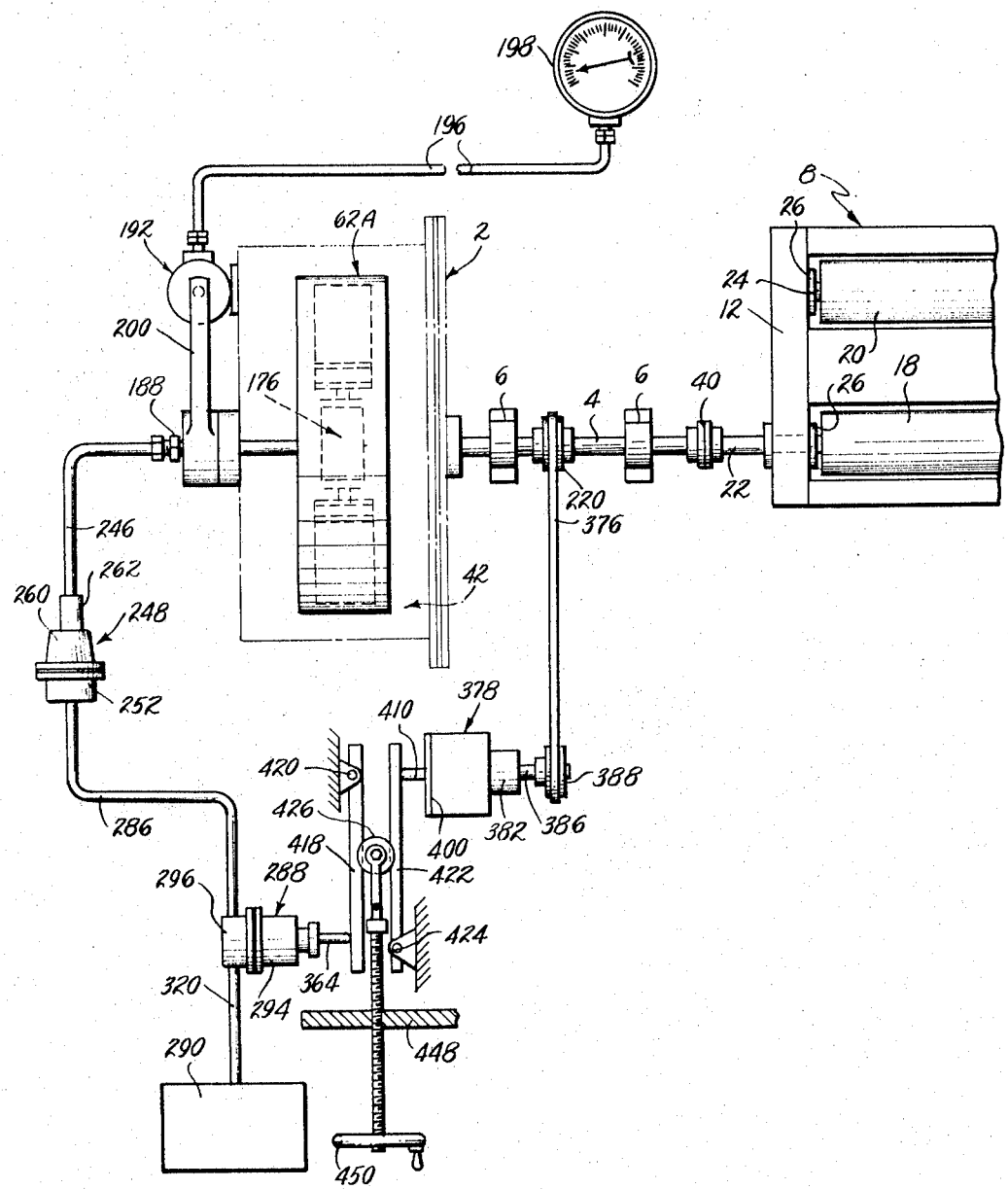

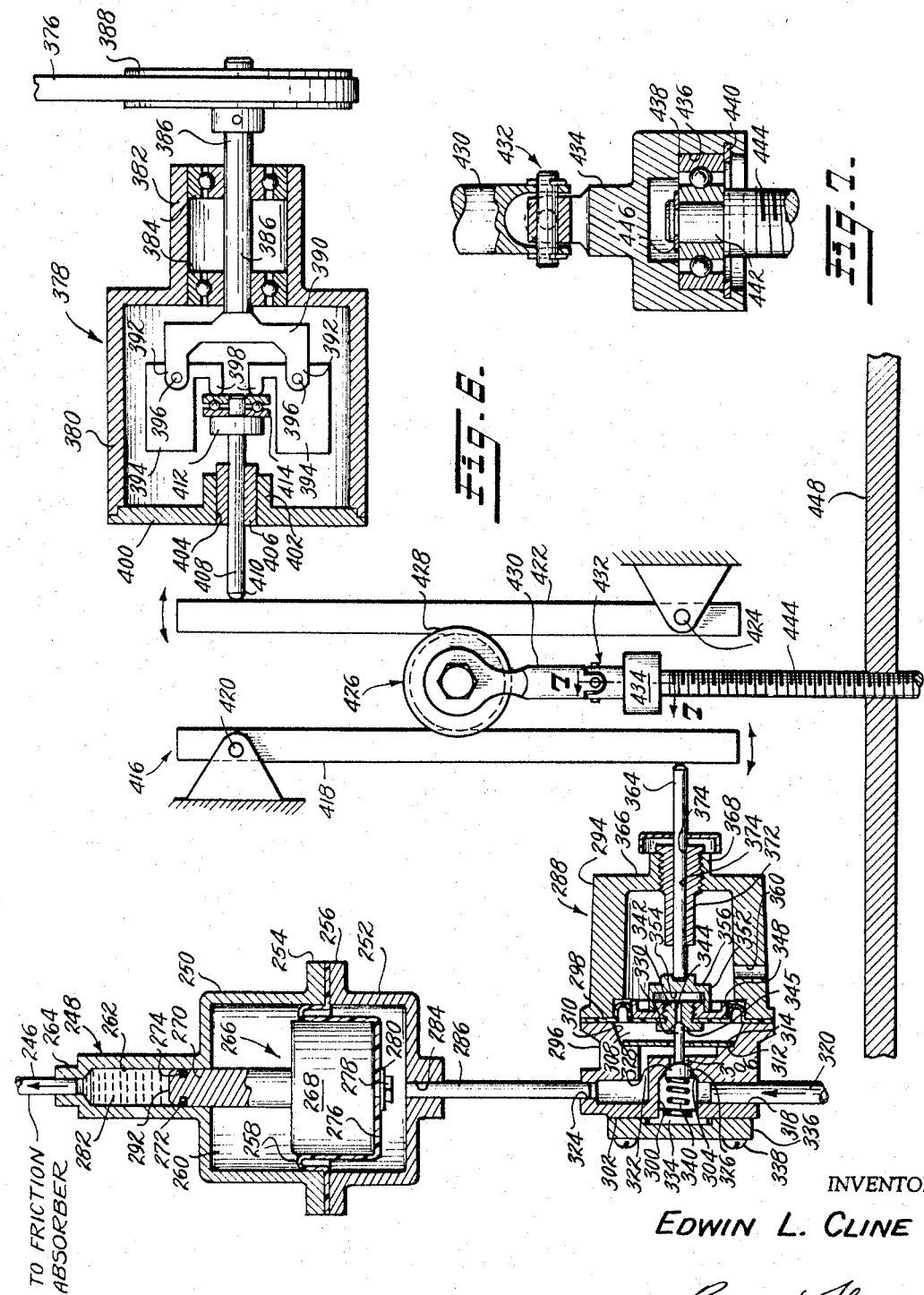

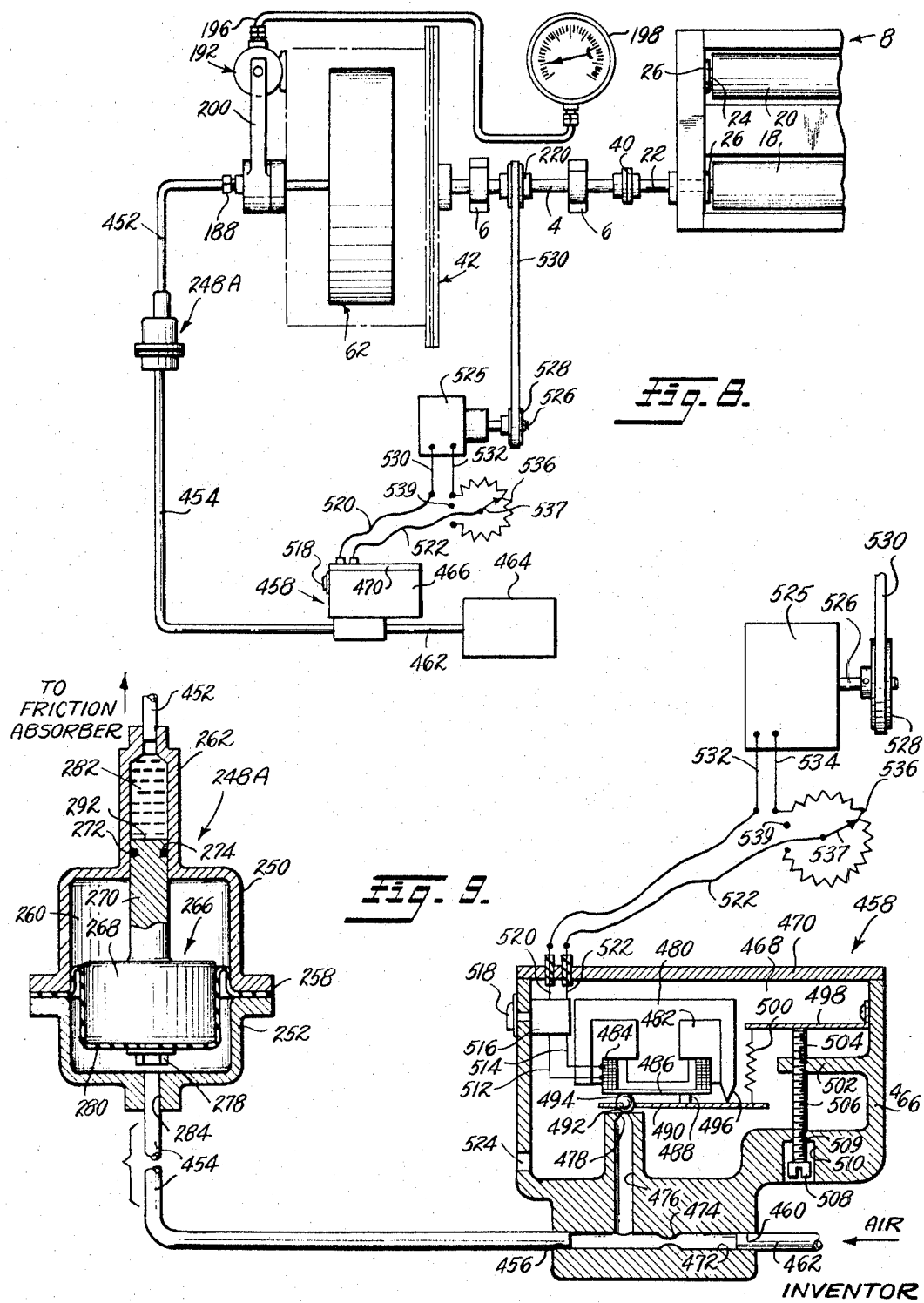

INVENTOR
EDWIN L. CLINE
BY Bacon & Thomas
ATTORNEYS

ENGINE AND FRICTION ABSORBER POWER VS. SPEED.
(NEGLECTING TEMPERATURE EFFECTS)

United States Patent Office 3,453,874
Patented July 8, 1969

3,453,874
APPARATUS FOR CONTROLLING THE CHARACTERISTICS OF FRICTION TYPE POWER ABSORPTION DEVICES
Edwin L. Cline, Pasadena, Calif., assignor to Clayton Manufacturing Company, El Monte, Calif., a corporation of California
Filed June 22, 1966, Ser. No. 559,490
Int. Cl. G01l 3/16
U.S. Cl. 73—135
11 Claims

ABSTRACT OF THE DISCLOSURE

Apparatus for controlling a rotary power absorber while absorbing driving torque produced by a prime mover. The power absorber includes a housing containing braking elements that are actuable by fluid pressure, either air or hydraulic pressure, or electrically to provide retarding force. The control means for the brake applying means is driven at a speed proportional to the speed of rotation of the prime mover so that fluid pressure or electrical current is produced in direct proportion to the speed of the prime mover or varies as the square of the speed of the prime mover. The retarding force is increased and decreased at a rate faster than the changes in speed and torque of the prime mover to avoid stalling of the prime mover as frequently occurs when a constant load is sought to be applied to the prime mover and there is a momentary failure in power of the prime mover.

---

This invention relates to equipment for testing the under-load performance characteristics of a prime mover by rotary friction type power absorption devices, and more particularly to novel load control means therefor. For convenience, such devices will hereinafter simply be referred to as friction absorbers.

Currently available friction absorbers comprise a rotating brake drum or disk to be connected with the output shaft of the prime mover, and stationary friction pads or brake shoes that are engageable with the drum or disk to apply a retarding force thereto by frictional contact. The degree of retarding action is dictated by the force with which this frictional contact is made. The system that is used to apply this force is referred to as the "Load Control System." In simple friction absorbers this is a "fixed" force and only one speed versus power curve is possible for the reason that a constant retarding force is applied regardless of the speed or torque that is developed by the engine. In more flexible friction absorbers, the load control will allow the operator to manually vary the force of frictional contact. In the case of a hydraulic actuated system, for example, this is accomplished by the operator varying the fluid pressure. A series of speed versus power curves can then be obtained.

Due to the speed versus power characteristics of friction absorbers, the "fixed" force load control system is unsatisfactory because, for a given contact pressure of the brake shoes, the retarding force remains constant (neglecting the effects of temperature) and the same amount of torque will be absorbed throughout the speed range. Friction absorbers that produce a constant retarding force are further objectionable, in that such devices will cause the prime mover to stall in the event that the engine should momentarily miss or lose power for any reason. Such constant force friction absorbers are still further objectional from the standpoint that they are unstable over the range in which the retarding force is equal to engine torque, which may cover a substantial speed range.

Since horsepower involves both speed and torque, the horsepower will increase and decrease directly with speed. In testing engines with friction absorbers, speed stability can be acquired only when the retarding force of the friction absorber increases and decreases with speed faster than that of the prime mover being tested. An ideal condition would be for the friction retarding force to start at zero with zero speed and change as a square of the speed change. This relationship is very close to the load imposed on a conventional automobile engine when the vehicle is driven on a level road and, hence, represents highly desirable loading characteristics to be simulated in practice. Such operational characteristics obviously cannot be attained with the "fixed" force load control for reasons stated above. Likewise, it is extremely difficult and practically impossible to establish and maintain such operating characteristics in a friction absorber by manual control of the force load, and, hence, such manual control leaves much to be desired.

Accordingly, there has long existed the need for load control means for friction absorbers that will render the same practical and avoid the principal objections thereto noted above. The load control means of the present invention is designed to obviate these objections and may take any one of several forms. Each load control means is made to simulate road conditions, to maintain stability at any speed, and to control the friction absorber means so that the retarding force of the friction absorber means is zero at zero engine speed and will rise and fall faster than the torque of the prime mover being tested. The present load control means contemplates hydraulic, pneumatic and/or electrical systems that are responsive to engine speed, and which can be adjusted and the load pre-selected to impose a retarding force of a given value at a given speed and automatically and correspondingly control the operating characteristics of the friction absorber in accordance with the foregoing relationship at all other speeds. Each system is also capable of being remotely controlled by an operator.

The present load control means is applicable in principle to all types of friction absorbers, irrespective of whether the friction absorber is directly or indirectly coupled with the output shaft of the prime mover. A direct method would be to connect the prime mover shaft directly to the input shaft of the friction absorber, as in an engine dynamometer test stand setup. An indirect method would involve the incorporation of the friction absorber in a chassis dynamometer for testing engines of automobiles or trucks without removing the engine from the vehicle. In this case, rolls are usually provided to form a type of treadmill for the drive wheels of the vehicle and the friction absorber is then connected with a driven roll. Power from the engine would then be normally transmitted to the friction absorber through the vehicle transmission and differential. For illustrative purposes, and not by way of limitation, the load control means of the present invention is shown and described in connection with a friction absorber associated with a chassis dynamometer.

The principal object of the present invention is to provide a load control apparatus for controlling the retarding force characteristics of a friction absorber, so that the retarding force produced thereby increases and decreases in value at a rate faster than the increases and decreases in driving torque applied to said absorber from a prime over, and so that the applied retarding force value for any given prime mover speed can be preselected at will.

Another object is to provide a dynamometer including a rotary friction absorber and control system for creating retarding force in opposition to driving torque applied thereto from a prime mover, designed so that the value of the retarding force will be changed in proportion to the occurring changes in driving torque and speed applied to said friction absorber by the prime mover.

A further object is to provide adjustable control means for a friction absorber, constructed so that various value relationships between retarding force and driving torque can be preselected.

Another object is to provide apparatus for controlling the friction characteristics of a friction absorber constructed to automatically vary the retarding force produced by the friction absorber in a preselected manner and as a function of the speed of rotation of the shaft supplying driving torque to said unit.

A more specific object is to provide load control means for friction absorbers, wherein means responsive to the speed of the prime mover being tested is utilized to produce either hydraulic pressure or pneumatic pressure and/or to generate electrical current of a value, proportional to the speed of the prime mover, to correspondingly vary the retarding force created by said friction absorbers to provide a preselected load on the prime mover at a given speed.

Another object is to provide load control means for a friction absorber that can be remotely controlled and which allows preselection of the degree of load to be applied to a prime mover.

Other objects and many of the attendant advantages of the invention will become readily apparent from the following description, when taken together with the accompanying drawings, wherein:

FIG. 1 is a diagrammatic plan view of a chassis dynamometer incorporating a friction absorber and showing one form of control system embodying the present invention utilizing hydraulic pressure for controlling the friction characteristics of said friction absorber;

FIG. 2 is an end elevational view of the friction absorber as seen along the line 2—2 in FIG. 1, and showing a torque arm for actuating a pressure transmitting device connected to a gauge for indicating the torque being absorbed;

FIG. 4 is a diagrammatic view, partly in cross-section, of the friction absorber and its hydraulic control system shown in FIG. 1;

FIG. 5 is a fragmentary, diagrammatic plan view similar to FIG. 1 of a chassis dynamometer incorporating a second embodiment of the invention, wherein the friction absorber is controlled by a pneumatic-hydraulic pressure transducer, an air control valve for supplying air under pressure to said transducer, and centrifugal force-responsive means for actuating said air control valve;

FIG. 6 is a diagrammatic view of the control system of FIG. 5, showing in cross-section the pneumatic-hydraulic transducer, the air pressure control valve therefor, and the centrifugal force-responsive means for actuating the air pressure control valve;

FIG. 7 is an enlarged fragmentary sectional view, taken along the line 7—7 in FIG. 6;

FIG. 8 is a diagrammatic plan view of a chassis dynamometer including an other embodiment of the invention wherein the control apparatus comprises a pneumatic-hydraulic pressure transducer, an electromagnetic responsive valve for supplying air under pressure to said transducer, and a tachometer generator for producing an electrical signal to operate said valve;

FIG. 9 is a fragmentary diagrammatic sectional view of the control apparatus of FIG. 8, particularly showing the internal construction of the pneumatic-hydraulic pressure transducer, and of the electromagnetic responsive air pressure control valve;

Figure 12:
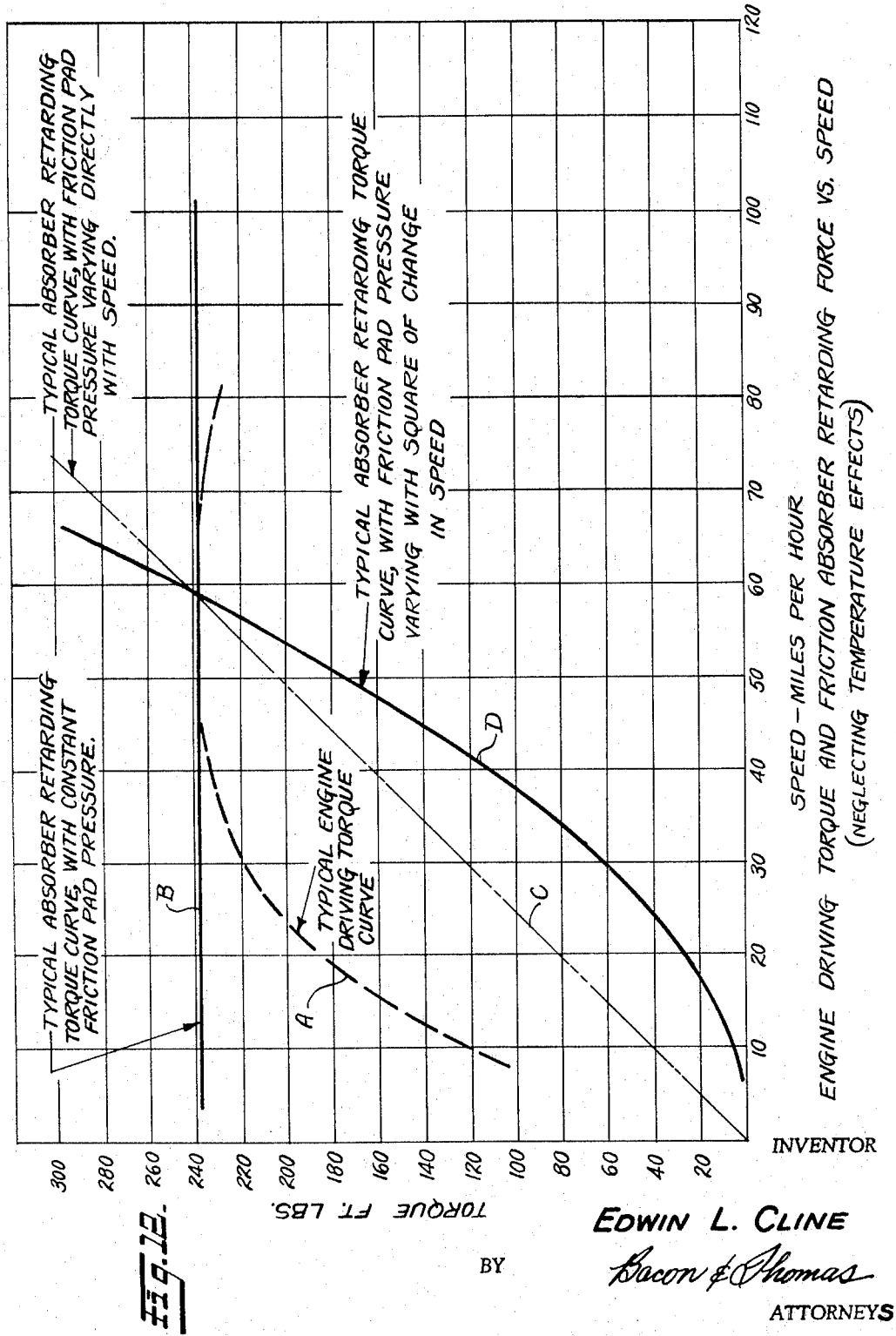
Figure 13:
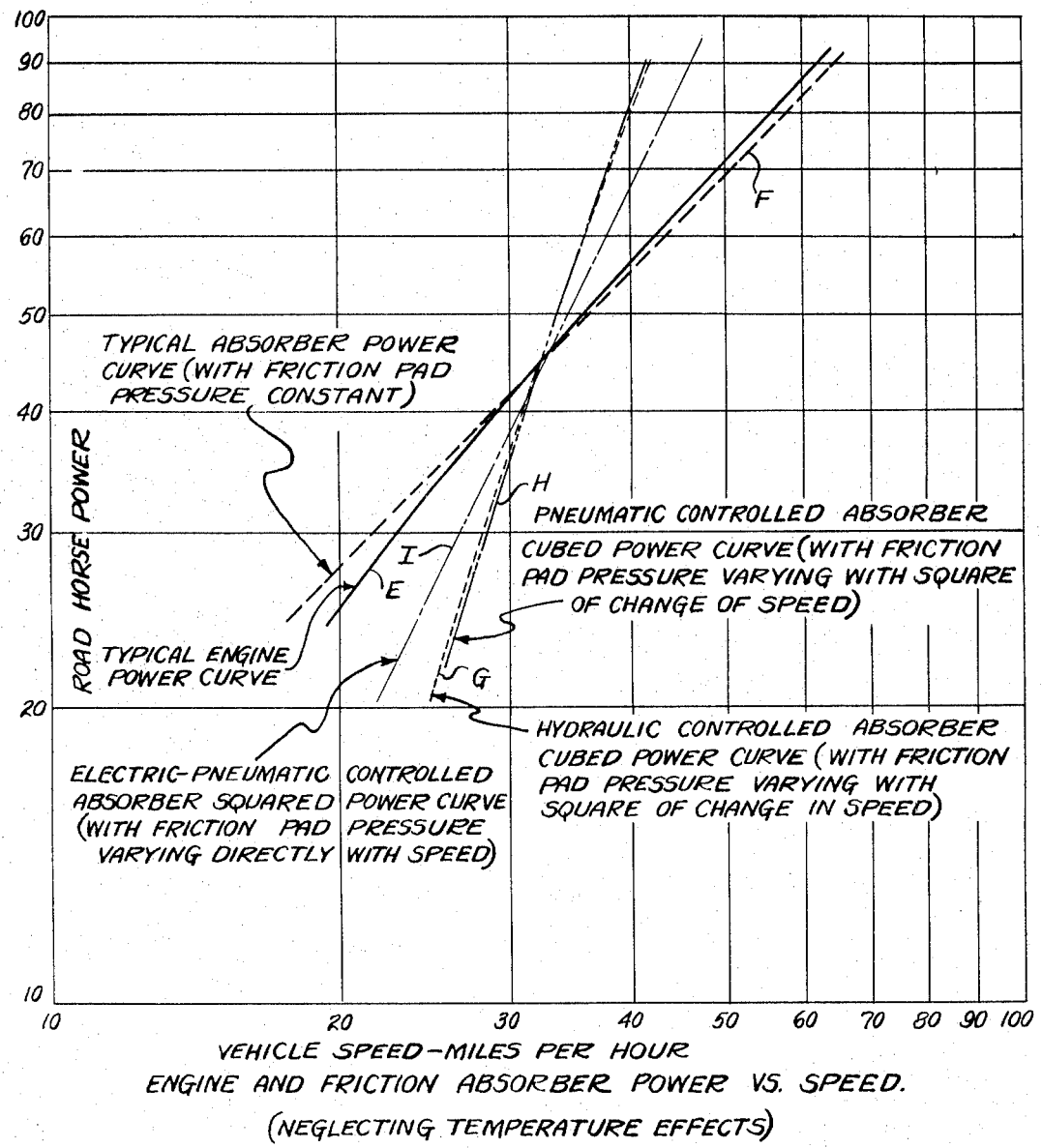

FIG. 12 is a graph comparing engine driving torque in foot pounds and friction absorber retarding force, with vehicle speed in miles per hour and showing in particular by the curves retarding force produced by controlling differently the pressure applied to the friction elements; and FIG. 13 is a graph comparing road horsepower absorbed by the friction absorber with vehicle speed in miles per hour, and showing typical power curves for the friction absorber resulting from using the load control systems of the present invention.

Referring now to FIGS. 1 to 4, a chassis dynamometer is shown for use in conducting under-load testing of the engine of a motor vehicle, the dynamometer including absorber assembly 2, to which driving torque is supplied by an input shaft 4 supported by spaced bearings 6. Driving torque is transmitted indirectly from the engine of the motor vehicle undergoing test to the input shaft 4 by a roll asesmbly 8, upon which the driving wheels W of the motor vehicle are supported.

The roll assembly 8 has a generally rectangular frame comprised of longitudinal side members 10, interconnected by transverse end members 12 and 14 and a central transverse member 16. A first pair of parallel rolls 18 and 20 is mounted on shafts 22 and 24, respectively, which are supported by bearings 26 mounted on the transverse members 12 and 16. A second pair of parallel rolls 28 and 30 is mounted between the transverse members 14 and 16 on shafts 32 and 34, respectively, supported by bearings 36. The rolls 18 and 28, and the rolls 20 and 30 are axially aligned, and the shafts 22 and 23 are connected by a coupling 38, so that the rolls 18 and 28 will rotate together. The shaft 22 extends beyond the end member 12, and is connected by a coupling 40 with the input shaft 4 of the power absorber assembly 2. Thus, when the engine of a motor vehicle positioned with its drive wheels W disposed on the rolls 18, 20, 28 and 30 is operated to rotate said wheels, the wheels will drive the rolls 18 and 28 to thereby transmit driving torque from the vehicle engine to the input shaft 4 of the power absorber assembly 2.

Figure 3:
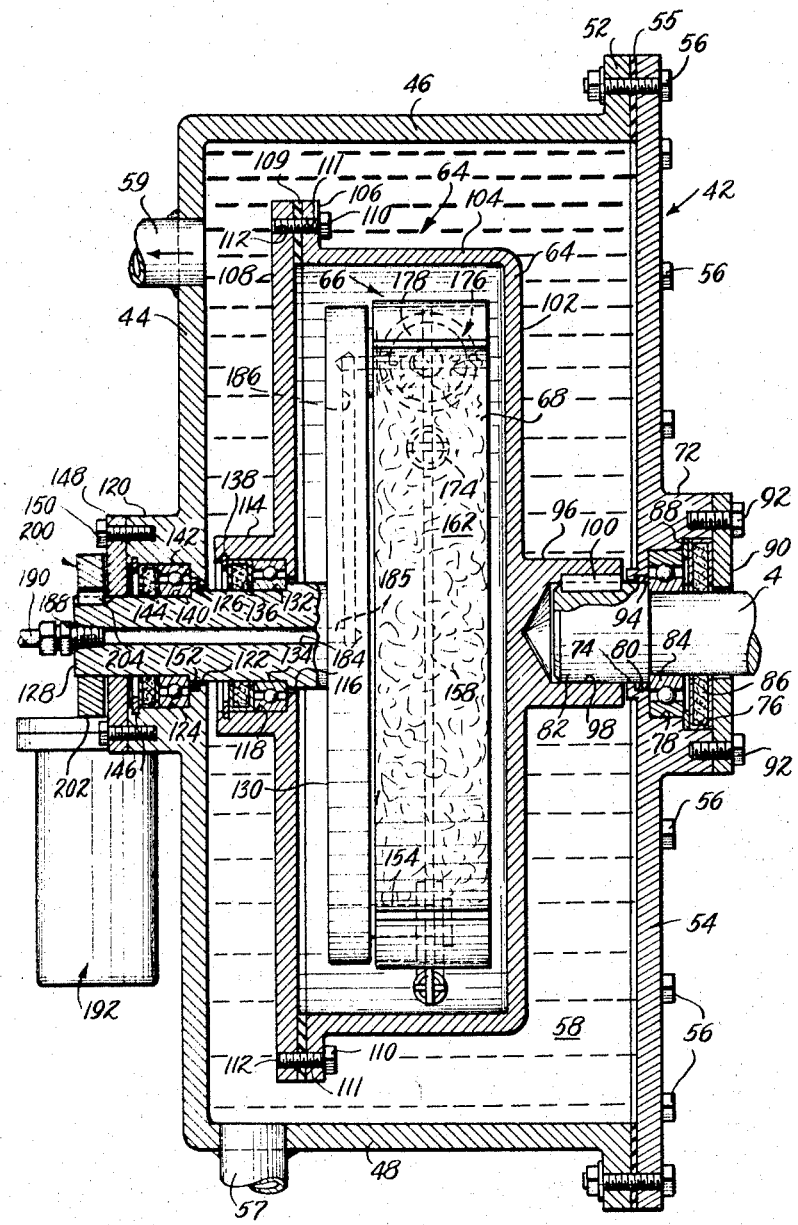
FIG. 3 is an enlarged vertical sectional view through the friction absorber, taken along the line 3—3 in FIG. 1, showing certain details of construction of the friction absorber, and the manner in which it is mounted in a coolant casing.

Referring now in particular to FIG. 3, the power absorber assembly 3 includes a coolant-receiving casing 42 having a rear wall 44, top and bottom walls 46 and 48, respectively, and side walls 50. The front of the casing 42 is open and is surrounded by an external flange 52. A cover plate 54 and a gasket 55 are mounted on the flange 52 to close and seal the casing 42, and are secured to said flange by bolts 56. The casing 42 has an inlet pipe 57 connected to an opening in the bottom wall 48 for admitting liquid coolant 58 into the casing. An outlet pipe 59 is connected to an opening near the top of the rear wall 44 of the casing for the discharge of said coolant.

The cover plate 54 has a centrally positioned boss 72 containing a bore 74. The bore 74 includes an outer enlarged portion 76, an intermediate portion 78, and an inner reduced portion 80. The input shaft 4 has an enlarged end portion 82 thereon, and extends through the bore 74, so that the end portion 82 is disposed within the reduced bore portion 80. A ball bearing 84 is seated within the intermediate bore portion 78, and its inner race abuts the shoulder of the enlarged shaft end 82. A rotary seal 86 is received within the enlarged bore portion 76 and seals the shaft 4. A retaining washer 88 is disposed between the seal 86 and the outer race of the bearing 84. The bearing 84, the washer 88 and the rotary seal 86 are held in assembled relation by an annular retaining plate 90, secured to the boss 72 by cap screws 92. A fluid pressure seal 94 is mounted within the reduced portion 80 of the bore 74, and engages the shaft 4 to prevent liquid from flowing outwardly therealong toward the bearing 84.

The rear wall 44 of the casing 42 has a central boss 120 through which extends a bore 122. The bore 122 has an enlarged outer portion 124, a short intermediate portion 126, and is aligned with the bore 74 in the boss 72 on the cover plate 54.

Mounted within the casing 42 is a friction absorber 62, which includes a rotor element or drum 64, and a stator element 66 carrying movable brake shoes or friction pad elements 68. The drum 64 comprises a hub 96 having a socket 98, in which is received the enlarged shaft end 82. The drum 64 is secured to the shaft 4 by a key 100 and further comprises a radial wall 102, which terminates in a cylindrical wall 104 having an external annular flange 106 at its open end. A circular plate 108 and a gasket 109 rest on the flange 106, and are secured by cap screws 110 passed through circumferentially spaced bores 111 in the flange 106 and threaded into tapped openings 112 in the plate 108. The plate 108 has a central boss 114 containing a bore 116 and an enlarged counterbore 118.

The stator 66 comprises a cylindrical shaft portion 128, which projects from a circular plate 130 of substantially smaller diameter than the inner diameter of the cylindrical wall 104. The shaft 128 has an intermediate stepped portion 132 upon which is received a ball bearing 134 and a rotary seal 136, the bearing 134 and the seal 136 being received within the counterbore 118 in the boss 114 and being secured in position by a snap ring 138. The shaft 128 also has an outer stepped portion 140, upon which is received a bearing 142 and a rotary seal 144. The bearing 142 and the seal 144 are disposed within the outer bore portion 122 in the boss 120 and are secured therein by a snap ring 146. An annular retaining plate 148 is secured to the front face of the boss 120 by cap screws 150, and a seal 152 is received in the intermediate bore portion 126 and engages the shaft 128 to prevent the flow of fluid 58 outwardly therealong.

Referring to FIGS. 3 and 4, the friction pad means 68 comprises a pair of arcuate brake shoes 158 and 160, each having brake lining material 162 secured thereto for frictionally engaging the inner cylindrical surface of the drum 64 when said shoes are moved outwardly. The plate 130 carries a pair of adjusting pins 154 and 156 upon which the brake shoes 158 and 160, respectively, are pivotally mounted. The shoes 158 and 160 include ears 164 and 166 that extend below the center of the pins 154 and 156 and are connected by a tension spring 168. Below their upper ends, the brake shoes 158 and 160, respectively, have openings 170 and 172 within which are connected the opposite ends of a return spring 174.

Mounted on the plate 130 between the upper ends of the brake shoes 158 and 160 is a conventional fluid pressure operated brake actuator unit 176, which includes a cylinder 178 having a pair of piston-operated rods 180 and 182 extending from the opposite ends thereof, it being understood that the rods 180 and 182 are moved outwardly by fluid pressure within the cylinder 178 to expand the brake shoes 158 and 160. When fluid pressure is relieved in the cylinder 178, the return spring 174 functions to retract the brake shoes 158 and 160 out of engagement with the drum 64.

The shaft 128, FIG. 3, has an axial bore 184 which communicates at its inner end with an axial bore 185 and a radial bore 186 in the plate 130. The radial bore 186 communicates with the interior of the cylinder 178 for conducting fluid pressure to and from said cylinder. The outer end of the bore 184 is threaded to receive a fitting 188 to which a conduit 190 is connected. Thus, by supplying fluid under pressure through the conduit 190 the actuator unit 176 can be operated to move the friction pad means 68 into frictional engagement with the drum 64. The force with which such engagement is made will control the value of the resultant retarding force when the rotor or drum 64 is revolved. The magnitude of such force can be controlled by varying the value of the fluid pressure applied through conduit 190.

Mounted on the rear wall 44 of the coolant casing 42, FIG. 2, and spaced from the shaft 128, is a transducer 192 for converting angular movement of the stator 66 into fluid pressure, said transducer including a housing 193 containing oil. An upwardly projected push rod 194 extends from a piston 195 mounted in the housing 193. A conduit 196 full of oil is connected to the transducer 192, and leads to a fluid pressure operated gauge 198, FIG. 1. The transducer 192 is constructed so that when the push rod 194 is depressed by mechanical force, hydraulic pressure will be produced by the piston 195 within the transducer and will be transmitted to the gauge 198 through the conduit 196. The hydraulic pressure will be relieved when the mechanical force applied to the push rod 194 is discontinued.

On the outer end of the shaft 128 is an arm 200 having a boss 202 fixed thereto by a key 204. The outer end 206 of the arm 202 rests on the push rod 194 of the transducer 192. When the brake actuator unit 176 is operated to move the friction pad means 68 into frictional engagement with the drum wall 104 and the rotor 64 is rotated clockwise (as viewed in FIG. 1), and shaft 128 and the stator 66 will tend to rotate therewith. Angular movement of the stator 66 will engage the outer end 206 of the arm 202 with the push rod 194, producing a fluid pressure signal for transmission to the gauge 198. The value of the signal will be proportional to the effective retarding force of the friction absorber 62 and, hence, the gauge 198 can be calibrated accordingly in foot pounds.

It is seen from the foregoing that the friction absorber 62 can be easily installed in and removed from the casing 42. Further, the condition of the brake lining material 162 can be easily inspected by draining coolant 58 from the casing 42, removing the front cover plate 54, removing the cap screws 110, and then sliding the rotor or drum 64 to the right, as viewed in FIG. 3.

When the rotor 64 is rotated while the friction pad means 68 is in engagement with the drum wall 104, heat will be generated between the relatively stationary brake shoes 162 and the moving surface of the drum wall 104, which heat results from mechanical power from the prime mover being converted into heat energy. It is by this conversion of driving torque, or mechanical power, to heat energy that the friction absorber 62 absorbs power from the prime mover, and the generated heat must be dissipated to prevent overheating of the friction absorber assembly 2. Among other things, overheating of the assembly 2 can drastically change the characteristics of the friction material 162, and hence can cause wide fluctuations in the value of effective retarding force. Dissipation of the friction-generated heat is accomplished by circulating water, or any other suitable coolant fluid 58, through the casing 42, the rate of circulation being preferably chosen to maintain the operating temperature of the friction absorber 62 substantially stable, so that changes in friction characteristics that would result from thermal effects are avoided. The coolant fluid 58 is admitted to the casing 42 through the conduit 57, and is discharged through the conduit 59.

Referring now to the graph of FIG. 12, the driving torque-speed characteristics for a typical motor vehicle engine is indicated by the curve A. Here, the values of torque in foot pounds are plotted as ordinates, and the corresponding vehicle speeds in miles per hour are plotted as abscissas. It is seen that the engine driving torque rises rapidly with increasing engine speed, from zero to about 25 miles per hour, and that thereafter driving torque increases at a slower rate with engine speed, until at about 47 miles per hour the driving torque becomes stabilized. Over the range from about 47 miles per hour to about 65 miles per hour, no appreciable increase in driving torque occurs. Above about 65 miles per hour, the value of engine driving torque decreases with increasing engine speed.

One manner of operating the friction absorber 62 would be to supply a constant fluid pressure to the brake actuator 176, the result of which is illustrated by the curve B in FIG. 12, wherein it is seen that the value of the retarding force would then be constant over the complete range of engine speed, from zero miles per hour upwardly.

While under-load testing a motor vehicle engine, or other prime mover, it is desirable to operate the engine at several different stable operating speeds. When using friction dynamometer equipment, such a stable speed is obtained by matching the value of the generated retarding force to the value of the driving torque, until operation of the prime mover at the desired preselected speeds results. Turning to the curves A and B in FIG. 12, it is seen that between about 47 and about 65 miles per hour the engine driving torque curve A is parallel with the constant value retarding force curve B. Because of this parallel relationship, it is practically impossible over this common driving speed range to match retarding force to the driving torque and effect stability. The result is a "hunting" action, or a "running wild" of the engine, and hence true performance testing of the engine is not possible.

Another problem, with a constant retarding force, results from the fact that in the lower speed ranges, driving torque decreases rapidly in value with decreased speed, as is shown by the curve A, FIG. 12. Thus, assuming that under-load testing is in progress at a substantially stable engine speed of 30 miles per hour, a problem arises if the engine should misfire or momentarily lose power. While there would then be an immediate decrease in driving torque, the retarding force would remain constant, and as the driving torque began to decrease, the constant retarding force would act to further slow the engine, and rapid decrease in driving torque would occur until the engine completely stalled. This condition can be alleviated by having the retarding force increase and decrease with changes in speed, and hence with driving torque.

It has been found that for the most efficient engine operation, the value of the retarding force should preferably be substantially zero at zero engine speed, and should rise and fall faster than the changes in the driving torque output of the prime mover being tested. When the value of the retarding force is thus varied, the power absorbed, versus engine speed, will increase and decrease more rapidly than engine power output. Referring again to FIG. 12, curve C represents a situation where retarding force is varied directly with changes in engine speed, which can be done by varying the value of the fluid pressure supplied to the brake actuator unit 176 in direct proportion to changes in the speed of the engine being tested. Thus, at zero speed the retarding force is also zero. As the engine speed increases, there is a corresponding increase in driving torque, and similarly, when engine speed decreases the retarding force changes accordingly. It is seen that the retarding force curve C cuts sharply across the typical driving torque curve A, at about 58 miles per hour, and that there are no regions where the retarding force curve C is parallel with the engine driving torque curve A. Thus, retarding force can easily be matched with driving torque to provide a stable operating speed, and there is no problem of engine stall occurring when there is a temporary decline in driving torque, because the retarding force follows such decline.

In the case of automotive engines, it has been found that the best relationship for retarding force is to have the value thereof increase and decrease as approximately the square of the change in speed, and to be zero at zero speed. The reason this is a nearly ideal condition is that it very closely simulates the load actually imposed on a conventional automobile engine while the vehicle is being driven on a level road. Such a retarding force versus speed curve is shown at D in FIG. 12. Such retarding force can be created by varying the value of the pressure on the friction pad elements 162 in accordance with the square of the changes in engine speed.

The load control apparatus of the present invention will vary, the speed, the pressure with which the friction pad elements 162 are urged into frictional engagement with the drum wall 104 of the rotor 64, and therefore is effective to vary the value of retarding force produced in proportion to the driving torque. The load control apparatus is designed so that the retarding force versus speed curve of the friction absorber 62 can be shifted to the right or left around zero in FIG. 12 to obtain nearly any desired value of retarding force at any given speed, whereby nearly any stable operating speed can be established for under-load testing of a prime mover.

Returning again to FIGS. 1 to 4, the apparatus shown therein for controlling the pressure supplied to the brake actuator unit 176 includes a positive displacement gear pump 208 having a input shaft 210, gear impellers 209 and 211, a fluid inlet port 212, and a fluid outlet port 214. The input shaft 210 has a pulley 216 thereon, which is driven by a belt 218 from a pulley 220 mounted on the power input shaft 4. Thus, since the positive displacement pump 208 is operated in response to rotation of the input shaft 4, the output of the pump in gallons per minute (neglecting slippage losses) will be directly proportionate to the speed of rotation of said shaft. Further, since the speed of rotation of the shaft 4 varies proportionate to the engine driving torque transmitted to the rolls 18 and 28, the output of the pump 208 is proportionate to the driving torque being developed by the engine.

The inlet port 212 of the pump 208 is connected by a conduit 222 to a reservoir 224 containing a suitable liquid 225, and the outlet port 214 is connected by a conduit 226 with one leg of a pipe-T 230. The signal pressure conduit 190 is connected to a second leg of the pipe-T 230, and the vertical leg of said pipe-T is connected to a return conduit 232, which discharges into reservoir 224. Connected in the return conduit 232 is a variable restrictive orifice valve 234, including an operating handle 236, which can be adjusted to vary the rate of flow through the orifice valve. A by-pass conduit 238 is connected at one end thereof to a pipe-T 239 in the conduit 226 at a point between the pump 208 and the pipe-T 230, and at its other end to a pipe-T 240 in the return conduit 232 downstream of the variable orifice valve 234. An adjustable relief valve 241 is connected in the by-pass conduit 238 as a safety means for relieving any excess hydraulic pressure in the control system.

When the pump 208 is operated, liquid 225 will be drawn thereinto from reservoir 224, and will flow from the pump outlet 214 through the conduit 226 to the pipe-T 230, and thence into the conduits 190 and 232. The variable flow control orifice valve 234 is constructed so that when it is fully open it will readily pass the maximum pump output, with nearly zero pressure drop thereacross. Under this condition, substantially no fluid pressure will be transmitted to the brake actuator unit 176 through the conduit 190, and the prime mover can be operated throughout its speed range without any load or retarding force being applied by the friction absorber 62.

When the handle 236 is adjusted to decrease the effective size of the orifice in the valve 234 below that which will accommodate flow with no pressure drop, a pressure differential across the orifice will result when liquid 225 is pumped through the conduit 232. The pressure build-up resulting in advance of the orifice valve 234 will establish a pressure signal which will be applied to the brake actuator unit 176 through the conduit 190; whereupon, the friction pad elements 68 will be urged into frictional engagement with the drum 64 to produce retarding force. The value of the hydraulic pressure supplied through the conduit 190 (and hence the value of the retarding force) will be determined for any given speed of the power input shaft 104 by the setting of the variable orifice valve 234; the smaller the orifice opening, the greater will be the pressure differential thereacross, and the greater will be the value of the hydraulic pressure transmitted to the brake actuator unit 176.

It is known that for any given setting of the flow control orifice valve 234, the pressure differential thereacross will change approximately as the square of the flow rate through the orifice. For example, if the flow rate through an orifice of given size is doubled, the pressure differential thereacross will be increased four times. Since output from the positive displacement pump 208 will increase and decrease directly with the speed of the power input shaft 4 (and hence with the speed of the prime mover), the magnitude of the pressure transmitted to the brake actuator unit 176 through conduit 190 will increase and decrease as the square of the change in speed for any given open position of the orifice valve 234. Therefore, the value of the retarding force produced by the friction absorber 62 will also change as the square of the speed of the power input shaft 4.

For any given setting of the orifice valve 234, it is seen that zero pressure will result at zero speed of the input shaft 104, with the result that retarding force must necessarily also be zero at zero speed. The control apparatus of FIGS. 1 to 4, therefore, will cause the retarding force and speed of the friction absorber 62 to have the relation represented by the curve D in FIG. 12. The value represented by this curve can be shifted to the right or to the left in FIG. 12 merely by increasing or decreasing the area of opening of the orifice valve 234. This results in corresponding decreases and increases, respectively, in the signal pressure transmitted through the conduit 190 at any given speed of the shaft 104. By using an adjustable orifice valve 234, it is possible to operate the device in conformance with any one of several possible resultant torque curves of the general shape of the curve D. If desired, a fixed size orifice can, of course, be substituted for the variable size orifice of the valve 234.

It is also seen that the curve D in FIG. 12 can be shifted to the right or left by varying the ratio between the speed of rotation of the positive displacement pump 208 and the input shaft 4. Such ratio changes can be effected by any suitable means, for example, by a variable speed drive mechanism, different sizes of pulleys, etc.

FIG. 13 is a graph wherein road horsepower is plotted against vehicle speed in miles per hour, the curve E showing a typical power curve for an automobile engine. A typical power curve for a friction absorber wherein the retarding force is constant is shown at F, and it is seen that the slope of the curve F is substantially less than that of the curve E, whereby the power absorbed by the friction absorber 62 rises and falls at a slower rate with speed than does engine power. On the other hand, the curve G plots the power absorbed by the friction absorber 62 of FIGS. 1 to 4, against engine speed in terms of vehicle speed in miles per hour, and it is seen that in this instance the absorbed power curved has a slope substantially greater than the engine power curve E, whereby the absorbed power rises and falls at a rate faster than the increases and decreases in engine power. The arrangement of FIGS. 1 to 4 thus makes it possible to easily attain any desired stable operating speed for a prime mover during under-load testing, and because retarding force and absorbed power rise and fall at faster rates than driving torque and engine power, rapid response of the friction absorber 62 to changes in vehicle speed is assured and the problem of stalling in instances where the prime mover momentarily loses power is eliminated.

To place the dynamometer apparatus of FIGS. 1 to 4 in operation, a source of water or other coolant 58 is first connected to the conduit 57, and flow of said coolant through the casing 42 is started. With the drive wheels W of a motor vehicle in place on the roll assembly 8, the engine of the vehicle is started and the transmission is engaged to cause the wheels W to revolve and drive the rolls 18–20 and 28–30. Driving torque is then transmitted by the rolls 18 and 28 to the input shaft 4 of the friction absorber 62. As the power input shaft 4 rotates, the positive displacement pump 208 will be driven at a speed proportional to the speed of rotation of said shaft.

The setting for the variable orifice valve 234 can be predetermined and not altered, or the size of said orifice can be varied during testing to provide the desired friction characteristics of the friction absorber 62 for the particular prime mover being tested. After the orifice valve 234 is properly set, and with the pump 208 operating, fluid 225 will be withdrawn from the reservoir 224 and pumped through conduit 226 and the orifice valve 234 in conduit 232. The resulting pressure differential across the orifice valve 234 will cause a build-up of pressure on the inlet side of said valve which will be transmitted through the conduit 190 to the brake actuator unit 176, the value of which, as has been explained, being determined by the size of the orifice in the valve 224 and by the speed of rotation of the input shaft 4.

Hydraulic pressure supplied through the conduit 190 to the actuator unit 176 moves the piston rods 180 and 182 outwardly, thus bringing the friction material 162 carried on the brake shoes 158 and 160 into engagement with the wall 104 of the brake drum or rotor 64. When the friction material 162 engages the drum 64 a retarding force is generated, the value thereof being determined by the hydraulic pressure produced and applied to the brake shoes 158 and 160 and which pressure is determined by the speed of the pump 208 and the setting of orifice valve 234.

The retarding force produced by the friction absorber 62 opposes the driving torque transmitted to the drum or rotor 64 by the input shaft 4, whereby the power output of the prime mover is absorbed by being changed into heat energy at the engaged friction surfaces. The flow of coolant 58 is adjusted to dissiptate the heat thus produced, the rate of flow of the coolant 58 being preferably controlled thermostatically so that the operation of the friction absorber is maintained stable.

When the friction material 162 is engaged with the inner surface of the rotating drum 64 to produce a retarding action, there will be a tendency for the stator to move slightly, angularly. The movement is transmitted through the arm 200 to the transducer 192 whereby a hydraulic pressure signal will be produced and conducted through conduit 196 to actuate the gauge 198, as previously explained.

Referring now to FIGS. 5 to 7, another embodiment of the invention is shown including a fluid pressure operated friction absorber 62A identical to the friction absorber 62 shown in FIGS. 1 to 4, and which is mounted within a casing 42 and supplied with driving torque by an input shaft 4 supported by bearings 6. The input shaft 4 is connected to a roll assembly 8 identical to that in FIGS. 1 to 4, and retarding action is measured by a mechanical force-fluid pressure transducer 192 operated by an arm 200.

The load control apparatus for the friction absorber 62A is different from that shown in FIGS. 1 to 4, and includes a conduit 246 connected at one end to the fitting 188 for supplying fluid pressure to the brake actuator unit 176, the other end of the conduit 246 being connected to an air pressure-hydraulic pressure transducer 248, shown in cross-section in FIG. 6. The transducer 248 includes an upper housing section 250 and a lower housing section 252 having flanges 254 and 256, respectievly, on their confronting ends and between which the outer margin of a flexible rolling diaphragm 258 is clamped. The housing section 250 has a hollow lower portion 260, and a reduced hollow upper portion 262, the latter terminating in a boss 264 to which the conduit 246 in connected.

Received within the housing sections 250 and 252 is a member 266 having a lower piston 268, and a relatively reduced upper plunger 270 slidably received within the portion 262 of the housing section 250. The plunger 270 carries a seal 272 in a groove 274 near its upper end. The lower face 276 of the piston 268 is engaged with the diaphragm 258, and the latter is secured thereto by a bolt 278 and a washer 280. The conduit 246 and the chamber in the housing portion 262 above the plunger 270 are filled with a suitable hydraulic fluid 82. Thus, when the member 266 is moved upwardly, the fluid 282 will be pressurized by the plunger 270 for operating the brake actuator unit 176.

The chamber in the lower housing section 252 has a port 284 communicating therewith, to which is connected one end of a conduit 286 leading from an air pressure control valve 288 connected to an air pressure source 290. When air pressure is supplied to the housing section 252 beneath the rolling diaphragm 258, the piston 266 will be moved upwardly to exert force on the fluid 282. The area 276 of the piston 266 against which air pressure acts through diaphragm 258 is several times greater than the area of the upper end face 292 of the plunger 270, so that the pressure on the surface 276 will be correspondingly multiplied in the fluid 282.

The control valve 288 is operable mechanically and automatically to control the value of air pressure transmitted from the source 290 to the lower section 252 of the transducer 248. The valve 288 includes right and left housing sections 294 and 296 (as viewed in FIG. 6) between the confronting ends of which a rolling diaphragm 298 is clamped. The housing section 296 has a valve chamber 300 extending from the end face 302 thereof, said valve chamber including a frusto-conical seat 304 at its bottom, and terminating in a passage 306 leading to a larger chamber 308. The chamber 308 has a frusto-conical side wall portion 310, which terminates at a shoulder 312, and faces the diaphragm 298. A circular valve seat 314 is secured to the shoulder 312. An inlet port 318 communicates with the central portion of the valve chamber 300, and one end of a conduit 320 extending from the pressure source 290 is connected thereto. An outlet chamber 322 leads from chamber 308 and the region of the passage 306 to an outlet port 324, to which one end of the conduit 286 is connected.

Received within the valve chamber 300 is a valve 326 having an enlarged head 328 with a hemi-spherical surface engageable with the seat 304 to close the passage 306, and a stem 330 which extends through the passage 306 and through a central opening in the seat 314. The outer end of the valve chamber 300 is closed by a plug 334 held in position by a plate 336 secured to the housing section 296 by screws 338. A spring 340 is compressed between the head 328 of the valve 326 and the plug 334, and functions to urge the spherical surface on said head into seating engagement with the seat 304.

The diaphragm 298 has a central opening therein, through which projects the threaded end of a flanged member 342 having an axial passage 344, one end of which is frusto-conical to provide a seat 345 for receiving the tip of the stem 330. The size of the passage 344 is chosen so that when the tip of the stem 330 contacts the seat 345, said passage will be closed. A diaphragm support member 348 having a central boss is threaded on the member 342 and secures it to the diaphragm 298.

A cup-shaped member 352 is fitted over the boss on the member 348 and has a wall 354 spaced from the end face of the members 342 and 348. A plurality of circumferentially spaced passages 356 extend through the wall 354. The housing section 294 has a vent port 360 in the wall thereof, whereby air under pressure flowing through the passage 344 will travel through the passages 356, and will exhaust through the vent port 360.

The end wall 366 of the housing section 294 has a boss 368 into which a flanged guide 372 is threaded. The guide 372 has an axial bore 374 through which a push rod 364 extends. The member 352 has a boss on the end thereof within which a socket is provided for the adjacent end of the push rod 364. The push rod 364 is actuated by a mechanical linkage under the control of a speed responsive device driven by a belt 376 from the pulley 220. The speed responsive device includes a flyweight centrifugal governor unit 378, comprising a cylindrical housing 380 having a reduced extension 382 at one end within which a pair of spaced ball bearings 384 is mounted. A shaft 386 rotates in the bearings 384, and has a pulley 388 secured to its outer end to be driven by the belt 376. Thus, the shaft 386 will be rotated at a speed directly proportional to the speed of the power input shaft 4.

The inner end of the shaft 386 has a cross member 390 from the ends of which extend axial supports 392. One end of a fly weight 394 is pivoted to each support 392 by a pin 396, so that when the shaft 386 is rotated, the free ends of said fly weights will be moved outwardly by centrifugal forces, as will be readily understood. Each of the weights 394 carries a lug 398, which will move axially away from the shaft 386 as the weights 394 swing outwardly upon rotation of said shaft.

The open end of the housing 380 is closed by a plate 400 having a central boss 402 containing a bore 404. A cylindrical bushing 406 is fixed in the bore 404, and slidably receives the stem 408 of an actuator element 410 having a head 412 adjacent to which is attached a ball thrust bearing 414. The lugs 398 engage one race of the bearing 414 in order to allow relative rotation between said lugs and the element 410.

When the shaft 386 is rotated and the weights 394 swing outwardly, the lugs 398 function to push the element 410 axially forwardly out of the housing 380. Thus, the centrifugal unit 378 functions to convert rotary movement of the shaft 386 into linear movement of the stem 408. The fly weights 394 and their lugs 398 are designed so that the element 410 will be moved axially in direct relationship to centrifugal force acting on the weights 394. Further, it is known that centrifugal force increases as the square of the change in rotational speed. Thus, the element 410 will be shifted axially according to the square of changes in speed of the shaft 386.

Movement of the element 410 is transmitted to the push rod 364 through a parallel lever arrangement 416, including a first lever 418, pivotally mounted at its upper end on a fixed pin 420 positioned in the same plane as the element 410. A second lever 422 extending parallel to the first lever 418, and pivotally mounted at its lower end on a fixed pin 424 is also disposed in the same plane as the push rod 364. The lower end of the lever 418 is engaged with the outer end of the push rod 364, and the upper end of the lever 422 is engaged by the outer end of the element 410.

The levers 418 and 422 are spaced apart, and received therebetween is an adjustable fulcrum wheel 426 having guide flanges 428 for retaining the levers 416 and 422 engaged with its outer surface. The fulcrum wheel 426 is carried by a yoke 430, the lower end of which is connected by a conventional universal joint 432 to a swivel head 434.

The swivel head 434 has a bore 436 in the underface thereof, within which a ball bearing 438 is secured by a snap ring 440. The reduced upper end 442 of a threaded rod 444 passes through the bearing 438 and is rotatably secured thereto by a snap ring 446. The rod 444 also extends through a threaded opening in a fixed plate 448, and has a hand wheel 450 mounted on its lower end. Thus, by turning the hand wheel 450 the fulcrum wheel 426 can be adjusted along the levers 418 and 422 from a position opposite the upper pivot pin 420 to a position opposite the lower pivot pin 424.

Depending upon where the fulcrum wheel 426 is positioned, the lever arrangement 416 can multiply or divide the overall axial movement of the element 410 and effect a proportionate movement of the push rod 364, and which movement, in any event, is correlated to the speed of the shaft 386.

For example, if the fulcrum wheel 426 is positioned directly opposite the upper pivot pin 420, no force would be transmitted to the push rod 364 by the element 410 because then no outward movement of said element could occur. The air control valve 288 would therefore remain closed during rotation of shaft 386, and no retarding action would be produced by the power absorption unit 62.

If the adjustable fulcrum wheel 426 is positioned midway between the pivot pins 420 and 424, the movement transmitted to the push rod 364 will be directly proportional to the force exerted on the lever 422 by the element 410. This force is then converted to a proportional air signal by the air control valve 288, and is transmitted to the air pressure-oil pressure signal by the ratio of the area 276 of the piston 268 exposed to air pressure, to the area 292 of the plunger 270 exposed to the hydraulic fluid 282, and produces fluid pressure for transmission through the conduit 246 to the brake actuator unit 176 of the friction absorber 62. As the speed of the prime mover, and hence of the rotor 64 of the friction absorber 62 is changed, the signal pressure to the brake actuator unit 176 will be changed with the square of the change in speed. The result is, that the retarding force produced by the friction absorber 62 in FIGS. 5 to 8 will have the characteristics of the curve D in FIG. 12, and the power curve for the friction absorber will be as shown at H in FIG. 13.

If the adjustable fulcrum wheel 426 is positioned closer to the lower pivot pin 424 than to the upper pivot pin 420, the force or movement transmitted to the push rod 364 is multiplied, resulting in a higher air pressure being transmitted to the transducer 248, and in a greater retarding force exerted by the power absorber unit 62. Similarly, if the movable fulcrum wheel 426 is positioned nearer the upper pivot pin 420 than the lower pivot pin 424, the signal pressure to the brake actuator unit 176 will be less than when said fulcrum wheel is positioned midway between the pivot pins 420 and 424. The force exerted on the movable friction pad elements 68 by the brake actuator unit 176 can thus be easily varied anywhere between zero and maximum for any given speed of the input shaft 4, merely by adjusting the position of the fulcrum wheel 426.

In operation, when no inward pressure is exerted on the push rod 364, the head 328 of the valve 326 will be held in engagement with the seat 304 by the coil spring 340, thus closing passage 306. No air pressure will then flow from the conduit 320 into the conduit 286.

When the push rod 364 is moved inwardly, the head 328 will be disengaged from the seat 304 and an annular passage from the valve chamber 300 to the passage 306 will be established. The size of this annular passage, and hence the rate of air flow through the passage 306 will vary with the extent to which the valve 326 is opened, said valve being designed so that the change in area of said annular flow space will be directly proportional to the inward movement of the push rod 364.

When the pressure on the push rod 364 is relieved, and said push rod is allowed to move outwardly, the spring 340 will return the valve 326 to seating engagement with the seat 304 for closing the passage 306. Thereafter, air pressure returned from the transducer 248 to the housing section 296 through the conduit 286 will act on the diaphragm 298 to move the same outwardly, thereby unseating the end of the valve stem 330 from the seat 345 at one end of passage 344. Air pressure will then exhaust to atmosphere through the passage 344, the passages 356, and the vent port 360, whereby air pressure on the bottom face of the piston 268 of the transducer 248 will be relieved. It is thus seen that by manipulating the push rod 364 the pressure exerted by the brake actuator unit 176 to engage the friction pad means 68 can be varied at will, and that for each longitudinal position of the push rod 364 there will be a corresponding air pressure established in the transducer 248, resulting in a corresponding fluid pressure being transmitted to the brake actuator unit 176.

The operation of the dynamometer of FIGS. 5 to 8 is substantially the same as the operation of the dynamometer of FIGS. 1 to 4, and hence will not be further described here. The essential similarity between these two embodiments is that in both, the pressure exerted by the brake actuator unit 176 to urge the friction pad elements 68 into frictional engagement with the rotor or drum 64 is varied as the square of the change is speed of the power input shaft 4, and can be adjusted to substantially any value over a wide operating range for any given speed of said input shaft. Thus, both provide effective and precise control of the value of the retarding force and the amount of power absorbed.

The curve C in FIG. 12 shows retarding force varying directly with changes in speed, the result obtained by varying, directly with the rotational speed of the input shaft 4, the pressure with which the friction pad elements 68 are urged into frictional engagement with the drum 64. An embodiment of the invention for producing the curve C of FIG. 12 is shown in FIGS. 8 and 9, wherein a friction absorber 62, identical to that shown in FIGS. 1 to 3 and 5 is employed. A conduit 452 conducts fluid to the brake actuator unit 176 of the unit 62, said conduit being connected with an air pressure-oil pressure transducer 248A identical with that shown in FIGS. 5 to 7. The transducer 248A includes an inlet port 284 to which is connected a conduit 454 leading from an outlet port 456 of an electromagnetic responsive air control value 458, said valve including an inlet port 460 to which air under pressure is supplied by a conduit 462 from a suitable source 464.

Referring to FIG. 9, the valve 458 includes a housing 466 having an upwardly opening chamber 468 therein, closed by a cover 470. The inlet port 460 and the outlet port 456 are connected by a passage 472, having a restricted orifice 474 therein. Downstream of the orifice 474, a vertical passage 476 intersects the passage 472, and extends upwardly into the chamber 468 to terminate in an air nozzle 478.

Mounted within the chamber 468 above the air nozzle 478 is a permanent magnet 480, including an annular chamber 482 within which is received a vertically movable magnetic coil 484. A mounting plate 486 is secured to the lower side of the coil 484, and has a fulcrum 488 attached thereto at a position spaced from the air nozzle 478. A beam 490 is attached to the fulcrum 488 for pivotal movement thereabout, and has an opening 492 positioned directly above the air nozzle 478. A ball 494 is seated in the opening 492 and is held between the beam 490 and the plate 486, the undersurface of said ball projecting through the opening 492 and being seatable on the air nozzle 478 for closing the same when the coil 484 moves downwardly.

The permanent magnet 480 includes a pointed fulcrum 496 positioned outwardly of the fulcrum 488, and on which the beam 490 is balanced. A flexible arm 498 is secured at one end to the housing 466, and a tension spring 500 is connected between the free end of said arm and the adjacent end of the beam 490. A web 502 projects inwardly from the housing 466 beneath the flexible arm 498, and has a threaded bore 504 positioned below about the midpoint of the flexible arm 498. The housing 466 has a socket 510, the bottom wall of which has an opening 509 in which a screw 506 is threaded so that its upper end is engaged with the flexible arm 598. The head 508 of the screw 506 is received in the socket 510, so that the screw 506 can be adjusted from outside the housing 466. When the screw 506 is threaded inwardly, the flexible arm 498 moves upwardly, increasing the tension in the spring 500 urging the outer end of the beam 490 upwardly. The tension spring 500 urges the beam 490 to pivot about the fulcrum 496, so as to urge the ball 494 toward the air nozzle 478 to close off flow through the same. Thus, by adjusting the screw 506, a preload can be placed on the beam 490.

When the coil 484 is energized, it will move downwardly to move the free end of the beam 490 and the ball 494 toward the air nozzle 478, the degree to which said nozzle is closed being determined by the extent of downward movement of the beam 490, which latter is determined by the value of the current supplied to the coil 484, the downward movement increasing with increases in the current.

The coil 484 has a pair of leads 512 and 514 extending therefrom to a range adjusting rheostat 516 mounted in the housing 466 and having an external operating knob 518. A pair of leads 520 and 522 extend from the rheostat 516 through the cover 470 of the housing 466, for supplying electrical current thereto. The housing 466 has a vent port 524 for exhausting air that has passed through the air nozzle 478.

A tachometer generator 525 is arranged to be driven by the power input shaft 4 and comprises a shaft 526 having a pulley 528 thereon which is connected with the pulley 220 by a belt 530. The generator 525 has a pair of leads 532 and 534 extending therefrom, the lead 532 being connected directly with the lead 520. The lead 534 is connected to one side of a variable rheostat 536, the sweep arm 537 of which is connected to the lead 522. The generator 524 is arranged to generate an electric current, the value of which will be directly proportional to the speed of rotation of the power input shaft 4. This current is then transmitted through the rheostat 536 to the electromagnetic responsive valve unit 458, where it is employed to energize the coil 484 for varying the air pressure transmitted through the conduit 454 to the transducer 248A. Thus, the arrangement shown in FIGS. 8 and 9 will produce retarding force which is directly proportional to the speed of rotation of the power input shaft 4, and hence to driving torque. The power characteristics of the apparatus shown in FIGS. 8 and 9 is indicated by the curve I in FIG. 13, the power absorbed by the friction absorber 62 in FIGS. 8 and 9 varying with the square of the changes in engine speed.

The value of the retarding force can be easily set in the embodiment of FIGS. 8 and 9 by merely adjusting the rheostate 536 to add, or remove, electrical resistance to or from the circuit. The greater the electrical resistance added by the rheostat 536, the less will be the current transmitted to the coil 484, and the less will be the resultant pressure exerted by the hydraulic brake actuator unit 176 on the friction pad elements 68 for urging them into frictional engagement with the rotor drum 64. The rheostat 536 also includes an "OFF" terminal 539, to which the sweep arm 537 can be moved to interrupt the circuit to the coil 484. The prime mover can then be operated throughout its speed range without the friction absorber 62 being operated.

In operation, air under pressure is supplied to the inlet port 460 through the conduit 462 and flows through the restrictor orifice 474. When the coil 484 is de-energized, the ball 494 will be out of engagement with the air nozzle 478, and all of the air flowing through the orifice 474 will flow through the passage 476, discharge through the air nozzle 478, and be exhausted from the housing 466 through the vent port 524. The air nozzle 478 is larger in diameter than the restrictor orifice 474, and the ball 492 and its supporting beam 490 are designed so that when the ball is fully raised, the air nozzle 478 will be substantially unobstructed. Under these conditions, substantially no pressure build-up can occur in the conduit 454 leading to the transducer 248A. However, the screw 506 is normally adjusted so that the ball 494 will partially restrict the air nozzle 478, thus creating a slight preload pressure in the conduit 454.

When electric current is supplied to the coil 484, the same will move downwardly a distance in direct proportion to the value of the current supplied thereto. As the coil 484 moves downwardly, the ball 494 will gradually close off the air nozzle 478, obstructing air flow therethrough and causing an increase in pressure in the conduit 454. This increase in air pressure is conducted to the transducer 248A where a hydraulic pressure signal is generated for transmission through the conduit 452 to the hydraulic brake applying unit 176 of the friction absorber 62. The dimensions of the air nozzle 478 and of the ball 494 are selected so that the size of the space through which air is discharged from the passage 476 varies so as to cause variations in pressure within the conduit 454 in direct proportion to the value of current supplied to the coil 484. It is thus seen that the force with which the friction pad elements 68 are urged into engagement with the drum 64 in FIGS. 8 and 9 will also be directly proportional to the value of the current supplied to the coil 484.

Under certain conditions, in the embodiment of FIGS. 5 to 9, it is possible to substitute a pneumatically operated brake actuator unit in place of the hydraulic brake actuator unit 176, for moving the friction pad means 68 into engagement with the rotor drum 64. If a pneumatic brake actuator unit is substituted for the hydraulic actuator unit 176, then the air-pressure fluid-pressure transducer 248 can be eliminated, and the friction pad elements 68 would then be operated directly by the air pressure output from the valves 288 and 458, respectively.

The embodiments of the invention thus far described all employ a friction absorber 62 utilizing a cylindrical brake drum wall 104 and brake shoes 158 and 160 having lining material 162 secured thereto, which arrangement resembles the conventional wheel brake utilized in motor vehicles. It is to be understood, however, that the principles of the load control means of the invention is not limited to such brake structure, but rather that it is equally usable with other types of braking apparatus capable of absorbing power. For example, a conventional disc brake arrangement could be substituted for the present drum and brake shoe arrangement.

Further, the concept of the present invention is not limited to friction brake apparatus operated by hydraulic or pneumatic brake actuator units, but also contemplates the use of suitable electromagnetic brake means. In any event, the concept of the load control apparatus of the invention is to operate the brake means, whatever its nature, as a function of the driving torque supplied to the rotor, so that the retarding force produced by the brake means is controlled to provide the desired relation between the driving torque and the retarding force for absorbing the torque.

Accordingly, another embodiment of the invention contemplates a friction absorber assembly utilizing conventional electromagnetically actuated brake means. Such elecromagnetic brake means may be of the type employing a medium of ferrous particles and oil between the rotor and stator elements, and wherein the braking effect will vary with the value of electrical current applied thereto.

Figure 10:
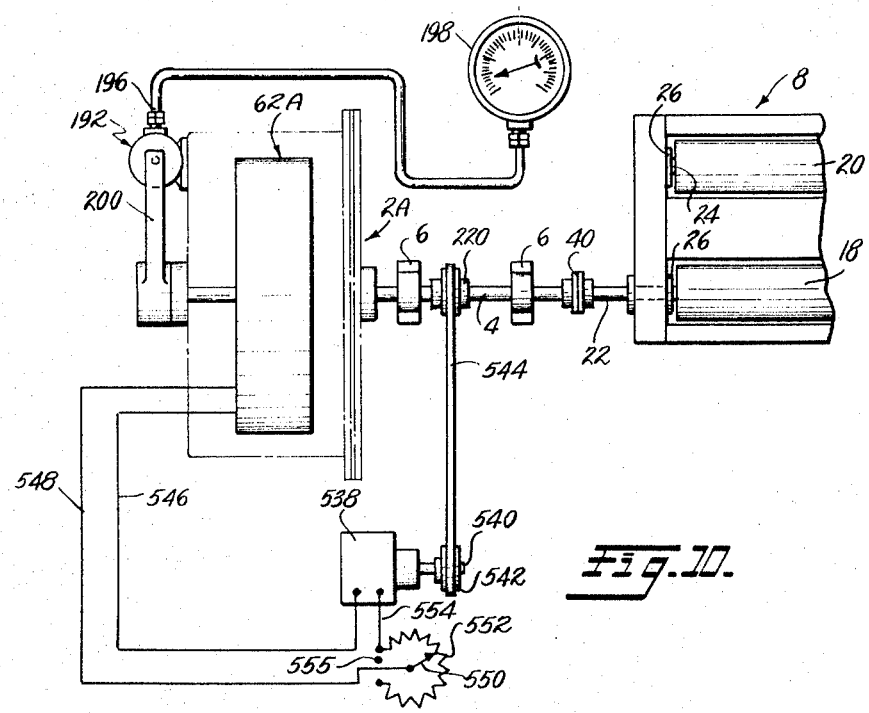
FIG. 10 is a diagrammatic plan view of another chassis dynamometer, including a friction absorber having electromagnetic actuated friction pad elements, and control apparatus for operating said friction absorber in response to the speed of the power input shaft while being driven by the vehicle wheels.
Figure 11:
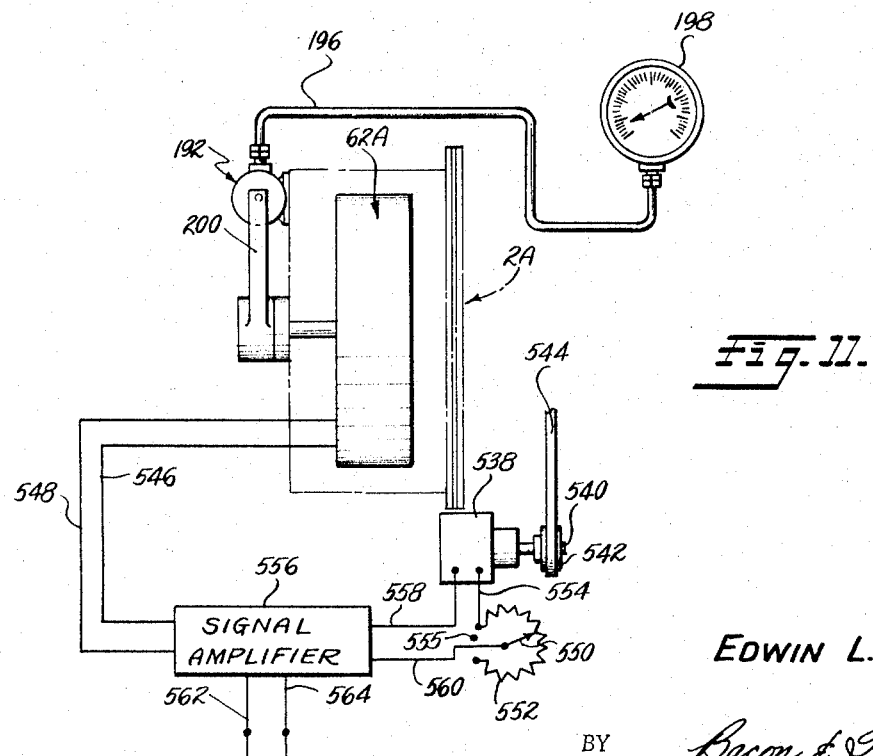
FIG. 11 is a diagrammatic view of a modification of the embodiment shown in FIG. 10, wherein the control apparatus includes a signal amplifier for amplifying and controlling the characteristics of the electric signal supplied to the electromagnetic responsive friction absorber.

Alternatively, and for illustrative purposes, FIGS. 10 and 11 illustrate a power absorber assembly 2A comprising a tachometer generator 538 identical to the tachometer generator 524 arranged to be driven by the power input shaft 4 and having a shaft 540 with a pulley 542 mounted thereon. The pulley 542 is driven by a belt 544 from the pulley 220. A pair of leads 546 and 548 extend from an electromagnetically actuated brake unit 62A, the lead 546 being connected directly to one terminal of the generator 538. The other lead 548 is connected to the sweep arm 550 of a rheostat 552, the input of said rheostat being connected by a lead 554 to the other terminal on the generator 538. The rheostat 552 also includes an "OFF" terminal 555, to which the sweep arm 554 can be moved to interrupt the flow of current to the brake unit 62A, whereby no retarding force will be produced when the power input shaft 4 is rotated.

The dynamometer assembly of FIG. 10 operates similarly to that of the other embodiments of the invention, in that when the shaft 4 is rotated by driving wheel torque, and the rheostate 552 is switched to an "ON" position, retarding force will be produced by the brake unit 62A. The value of the retarding force will vary directly with the speed of the shaft 4, and thus the retarding force versus speed curve for the dynamometer assembly 10 will correspond to the curve C in FIG. 12, and the power curve for said assembly will correspond to the power curve I in FIG. 13. The retarding force to be produced at any given speed of the shaft 4 is adjusted by the rheostate 552. The greater the resistance inserted into the circuit by the rheostate 552, the smaller will be the current transmitted to the brake unit 62A, and the smaller will be the value of the retarding force at a given speed, and vice versa.

A modification of the embodiment shown in FIG. 10 is illustrated in FIG. 11, wherein a signal amplifier 556 is connected between the rheostat 552 and the electromagnetic brake unit 62A. The leads 548 and 546 from the friction absorber 62A are connected to the output terminals of the signal amplifier 556, and a lead 558 connects one terminal of the generator 538 to one input terminal of the amplifier 556. A lead 560 connects the sweep arm 550 to the other input terminal of the amplifier 556. The signal amplifier 556 is supplied with current through leads 562 and 564 from a suitable power source.

Electromagnetic responsive brake apparatus of the type employed in the friction absorber 62A can typically be operated by a very small current, such as is generated by the tachometer generator 538. In some instances, however, it is desirable to amplify the output of the generator 538, and the signal amplifier 556 in FIG. 11 serves this purpose. The arrangement of FIG. 11 also makes possible control over the signal transmitted to the brake unit 62A.

It is known that power signal amplifiers, such as that indicated at 556, can be constructed so that the amplified output signal thereof can be any preselected function of the input signal supplied thereto. Thus, by properly setting the amplifier 556, the electrical signal supplied through the leads 546 and 548 can vary directly, as the square, or as some other mathematical power of the changes in speed of the shaft 4, even though the signal supplied from the generator 538 varies only directly with the speed of the input shaft 4. The arrangement of FIG. 11 thus makes possible great flexibility in retarding force and absorbed power obtainable from the friction absorber 62A.

Obviously, many additional modifications and variations of the present invention are possible in the light of the above teachings.

I claim:

1. Load control means for controlling the retarding force characteristics of a rotary power absorber for absorbing driving torque from a shaft while said shaft is being driven by a prime mover, said rotary power absorber including means for producing retarding force, and fluid pressure responsive actuating means for causing said first-mentioned means to produce a retarding force to oppose said driving torque, comprising: a positive displacement pump to be driven by the prime mover for producing a fluid pressure corresponding in value to, and varying as the speed of rotation of, the prime mover; and means for transmitting said fluid pressure to said actuating means to apply a retarding force of a corresponding value to the rotary power absorber, whereby the load value of said retarding force will vary as a function of the speed of rotation of said prime mover.

2. Load control means as defined in claim 1, wherein the value of the retarding force is varied in accordance with substantially the square of the speed of rotation of the prime mover.

3. Load control means as defined in claim 1, wherein the rotary power absorber includes a rotor connected with said shaft, and wherein the actuating means for producing the retarding force includes friction brake means engageable with said rotor and actuated by hydraulic pressure produced by the driving of said positive displacement pump.

4. Load control means as defined in claim 3, including a housing, and wherein the rotor and friction brake means are disposed within said housing.

5. Flow control means as defined in claim 1, wherein the positive displacement pump has an inlet and an outlet and wherein the load control means further includes a reservoir containing liquid; means connecting said pump inlet with said reservoir, said pump having a shaft to be operated at a speed proportional to the rotational speed of the prime mover; and wherein the means for transmitting the fluid pressure to the actuating means includes a first conduit connecting said pump outlet with said actuating means for producing pressure therein to create a corresponding retarding force; a second conduit connected at one end thereof to said first conduit at a point between said pump and said actuating means and having its other end leading to said reservoir; and flow restrictor means in said second conduit operable to control the rate of flow from said pump through said second conduit to thereby control the value of the pressure to be transmitted to said actuating means through said first conduit.

6. Load control means for a rotary power absorber as defined in claim 5, wherein a by-pass conduit is connected between the first and second conduits; and wherein a pressure relief valve is connected in said by-pass conduit.

7. A friction type power absorber for analyzing the performance of a prime mover, comprising: a brake shaft for receiving the driving torque from a prime mover; power absorption means including a rotatable member connected with said shaft and further including means cooperable with said rotatable brake member to produce retarding torque in opposition to driving torque applied to said shaft by said prime mover; control means comprising a positive displacement pump driven by said shaft and connected with said power absorption means and arranged to automatically actuate said means for producing retarding force in response to changes in speed of rotation of said shaft to automatically vary the value of said retarding force so that it is zero at zero speed of said shaft and increases and decreases in value at a rate faster than that of the speed of said shaft.

8. A friction type power absorber for use in analyzing the performance of a prime mover, comprising: a brake shaft for receiving the driving torque from a prime mover; power absorption means including rotor means connected to receive driving torque from said shaft, stator means operatively disposed relative to said rotor means; friction brake means carried by one of either said rotor or stator means and movable into and out of frictional engagement with the other; and actuator means operable to apply force for moving said friction brake means into said frictional engagement to thereby apply retarding force to said rotor in opposition to driving torque applied thereto by said shaft, the value of said retarding force varying with the force exerted by said actuator means; and control means including a positive displacement pump driven by said shaft and connected in a fluid system with said actuator means and arranged to operate said actuator means in response to the speed of rotation of said shaft so that the force exerted on said friction brake means by said actuator means varies as a function of said rotational speed and so that said retarding force is substantially zero at zero speed of said shaft and increases and decreases in value at a rate faster than said driving torque.

9. A friction power absorber as defined in claim 8, including measuring means connected with the stator for measuring the value of the retarding force.

10. A friction power absorber as defined in claim 8, wherein the brake shaft is connected with a dynamometer roll shaft whose roll is driven by the wheel of a vehicle through power supplied by the vehicle engine.

11. A friction type power absorber for use in analyzing the performance of a prime mover, comprising: a brake shaft for receiving the driving torque from a prime mover; power absorption means including rotor means connected to receive driving torque from said shaft, stator means operatively disposed relative to said rotor means; friction brake means carried by one of either said rotor or stator means and movable into and out of frictional engagement with the other; and fluid pressure operated actuator means operable to apply force for moving said friction brake means into said frictional engagement to thereby apply retarding force to said rotor in opposition to driving torque applied thereto by said shaft, the value of said retarding force varying with the force exerted by said actuator means; and control means including a positive displacement pump driven by said shaft and constituting an element of a fluid system for controlling said actuator means and arranged to control the operation of said actuator means by fluid pressure regulated in accordance with the speed of rotation of said shaft so that the force exerted on said friction brake means by said actuator means varies as a function of said rotational speed and so that said retarding force is substantially zero at zero speed of said shaft and increases and decreases in value at a rate faster than said driving torque.

References Cited
UNITED STATES PATENTS

| | | | |
|---|---|---|---|
| 1,141,802 | 6/1915 | Johnson | 73—135 |
| 2,012,109 | 8/1935 | Shroyer | 73—135 |
| 2,012,110 | 8/1935 | Shroyer | 73—135 XR |
| 3,312,105 | 4/1967 | Amtsberg | 73—135 |

CHARLES A. RUEHL, *Primary Examiner.*